(12) United States Patent
Ohara et al.

(10) Patent No.: US 11,388,756 B2
(45) Date of Patent: Jul. 12, 2022

(54) TERMINAL FOR COMMUNICATING WITH A BASE STATION APPARATUS

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 196 days.

(21) Appl. No.: 16/635,867

(22) PCT Filed: Aug. 9, 2017

(86) PCT No.: PCT/JP2017/029005
§ 371 (c)(1),
(2) Date: Jan. 31, 2020

(87) PCT Pub. No.: WO2019/030874
PCT Pub. Date: Feb. 14, 2019

(65) Prior Publication Data
US 2020/0367287 A1    Nov. 19, 2020

(51) Int. Cl.
*H04W 74/08* (2009.01)
*H04W 72/02* (2009.01)
*H04W 72/04* (2009.01)
*H04W 72/08* (2009.01)

(52) U.S. Cl.
CPC ....... *H04W 74/0833* (2013.01); *H04W 72/02* (2013.01); *H04W 72/046* (2013.01); *H04W 72/085* (2013.01)

(58) Field of Classification Search
CPC ............ H04W 74/0833; H04W 72/02; H04W 72/085; H04W 72/046
See application file for complete search history.

(56) References Cited

U.S. PATENT DOCUMENTS

2014/0376466 A1    12/2014   Jeong et al.

FOREIGN PATENT DOCUMENTS

| EP | 3419340 A1 | 12/2018 | |
| JP | 2006-505158 A | 2/2006 | |
| WO | WO-2004040931 A2 * | 5/2004 | ............ H04W 48/18 |
| WO | 2016-086144 A1 | 6/2016 | |

OTHER PUBLICATIONS

LG Electronics "Discussion of RACH Procedure" (Year: 2017).*
Ericsson "Higher Layer Implications of beamforming during random access" (Year: 2017).*

(Continued)

*Primary Examiner* — Ayanah S George
(74) *Attorney, Agent, or Firm* — Osha Bergman Watanabe & Burton LLP (57) ABSTRACT

User equipment includes a receiver that communicates with a base station apparatus, and that receives, from the base station apparatus, one or more blocks associated with one or more beams transmitted from the base station apparatus, the one or more blocks including information used for initial access; a controller that selects a block used for determining a resource for transmitting a preamble from the one or more blocks, based on received power or reception quality of the one or more beams; and a transmitter that transmits the preamble to the base station apparatus using the resource.

5 Claims, 7 Drawing Sheets (56) References Cited

OTHER PUBLICATIONS

Office Action issued in Korean Application No. 10-2020-7001916; dated May 28, 2021 (13 pages).
Extended European Search Report issued in counterpart European Patent Application No. 17921279.0, dated Nov. 26, 2020 (11 pages).
NTT Docomo, Inc.; "Discussion on 4-step random access procedure for NR"; 3GPP TSG RAN WG1 Meeting #88, R1-1702831; Athens, Greece; Feb. 13-17, 2017 (10 pages).
LG Electronics; "Discussion on Power Control issue for Message 1 and 3"; 3GPP TSG RAN WG1 Meeting NR# 2, R1-1710270; Qingdao, P.R. China; Jun. 27-30, 2017 (4 pages).
International Search Report for corresponding International Application No. PCT/JP2017/029005, dated Oct. 24, 2017 (5 pages).
Written Opinion for corresponding International Application No. PCT/JP2017/029005, dated Oct. 24, 2017 (6 pages).
LG Electronics; "Discussion on RACH Procedure"; 3GPP TSG-RAN WG1 NR ad hoc Meeting, R1-1700463; Spokane, USA; Jan. 16-20, 2017 (6 pages).
Ericsson; "Higher layer implications of beamforming during random access"; 3GPP TSG-RAN WG2 #97, R2-1700881; Athens, Greece; Feb. 13-17, 2017 (7 pages).
Zte et al: "Unified RACH procedure"; 3GPP TSG RAN WG1 Meeting #87, R1-1611273; Reno, USA; Nov. 14-18, 2016 (10 pages).
3GPP TS 36.213 V14.3.0; "3rd Generation Partnership Project; Technical Specification Group Radio Access Network; Evolved Universal Terrestrial Radio Access (E-UTRA); Physical layer procedures (Release 14)"; Jun. 2017 (460 pages).
3GPP TS 36.211 V14.3.0; "3rd Generation Partnership Project; Technical Specification Group Radio Access Network; Evolved Universal Terrestrial Radio Access (E-UTRA); Physical channels and modulation (Release 14)"; Jun. 2017 (195 pages).
Office Action issued in the counterpart Japanese Patent Application No. 2019-535521, dated Mar. 16, 2021 (6 pages).
Spreadtrum Communications; "Discussion on beam refinement"; 3GPP TSG RAN WG1 meeting #89, R1-1707787; Hangzhou, China; May 15-19, 2017 (5 pages).
ZTE Corporation; "Discussion on measurement report"; 3GPP TSG RAN WG2#NR_AdHoc#2, R2-1706895; Qingdao, China; Jun. 27-29, 2017 (4 pages).
Ericsson; "Access Control for NR"; 3GPP TSG-RAN WG2 NR#2, Tdoc R2-1706505; Qingdao, P.R. of China; Jun. 27-29, 2017 (5 pages).

\* cited by examiner

TERMINAL FOR COMMUNICATING WITH A BASE STATION APPARATUS

TECHNICAL FIELD

The present invention relates to user equipment of a radio communication system.

BACKGROUND ART

In 3GPP (3rd Generation Partnership Project), in order to achieve a further increase in the system capacity, a further increase in the data transmission rate, a further reduction in latency in the radio section, and so forth, a study of a radio communication scheme referred to as 5G or NR (New Radio) has been progressed (the radio communication scheme is referred to as "NR," hereinafter). For NR, in order to meet the requirement that the latency in the radio section is reduced to be less than or equal to 1 ms, while achieving the throughput of greater than or equal to 10 Gbps, various types of radio technology have been studied.

In NR, during initial access for establishing a connection between user equipment and a base station apparatus, the user equipment obtains a part of system information, which is required for cell detection and cell identification based on a synchronization signal transmitted from the base station apparatus and the initial access (e.g., Non-Patent Document 1).

Further, in NR, it is assumed that a wide frequency range is used, which is from a low frequency band similar to that of LTE (Long Term Evolution) to a frequency band that is higher than that of LTE. Especially, as propagation loss is large in a high frequency band, in order to compensate for the propagation loss, it has been studied to apply beam forming with a narrow beam width (e.g., Non-Patent Document 2).

RELATED ART DOCUMENT

Non-Patent Document

Non-Patent Document 1: 3GPP TS 36.213 V14.3.0 (2017-06)
Non-Patent Document 2: 3GPP TS 36.211 V14.3.0 (2017-06)

SUMMARY OF THE INVENTION

Problem to be Solved by the Invention

In NR, a part of the synchronization signal and the system information that is required for the initial access is mapped onto a radio frame on a basis of a resource unit called an SS block (Synchronization Signal block), which is formed of successive OFDM (Orthogonal Frequency Division Multiplexing) symbols. The user equipment receives the SS block transmitted from the base station apparatus to obtain information required for the initial access. The information required for the initial access includes information for identifying a preamble format and a RACH (Random Access Channel) resource.

Additionally, in NR, the base station apparatus applies beam forming to transmit a plurality of beams. The user equipment receives the SS blocks associated with the beams, and obtains information required for initial access, which is included in the SS blocks. Accordingly, the user equipment may receive the plurality of SS blocks associated with different beams, respectively, and the user equipment is required to determine, based on which SS block, initial access is to be executed.

The present invention is achieved in view of the above-described point, and an object is to select, in a radio communication system, an appropriate system information item required for initial access by user equipment, from a plurality of system information items associated with the beams.

Means to Solve the Problem

According to the disclosed technology, there is provided user equipment including a receiver that communicates with a base station apparatus, and that receives, from the base station apparatus, one or more blocks associated with one or more beams transmitted from the base station apparatus, the one or more blocks including information used for initial access; a controller that selects a block used for determining a resource for transmitting a preamble from the one or more blocks, based on received power or reception quality of the one or more beams; and a transmitter that transmits the preamble to the base station apparatus using the resource.

Advantageous Effects of the Invention

According to the disclosed technology, in the radio communication system, the user equipment can select an appropriate system information item from a plurality of system information items associated with the beams required for the initial access.

EMBODIMENTS OF THE INVENTION

In the following, an embodiment of the present invention is described by referring to the drawings. Note that the embodiment described below is an example, and embodiments to which the present invention is applied are not limited to the embodiment described below.

For the operation of the radio communication system according to the embodiment, the existing technology is appropriately used. The existing technology may be, for example, the existing LTE; however, the existing technology is not limited to the existing LTE. Additionally, the term "LTE" used in this specification has a broad meaning including LTE-Advanced and schemes on and after LTE-Advanced (e.g., NR), unless as otherwise specified.

Further, in the embodiment described below, the terms are used, which are used in the existing LTE, such as SS (Synchronization Signal), PSS (Primary SS), SSS (Secondary SS), and PBCH (Physical broadcast channel); however, this is for convenience of the description, and signals, functions, and so forth similar to these may be referred to by different names. Furthermore, the above-described terms in NR are denoted as NR-SS, NR-PSS, NR-SSS, NR-PBCH, etc.

<System Configuration>

Figure 1:
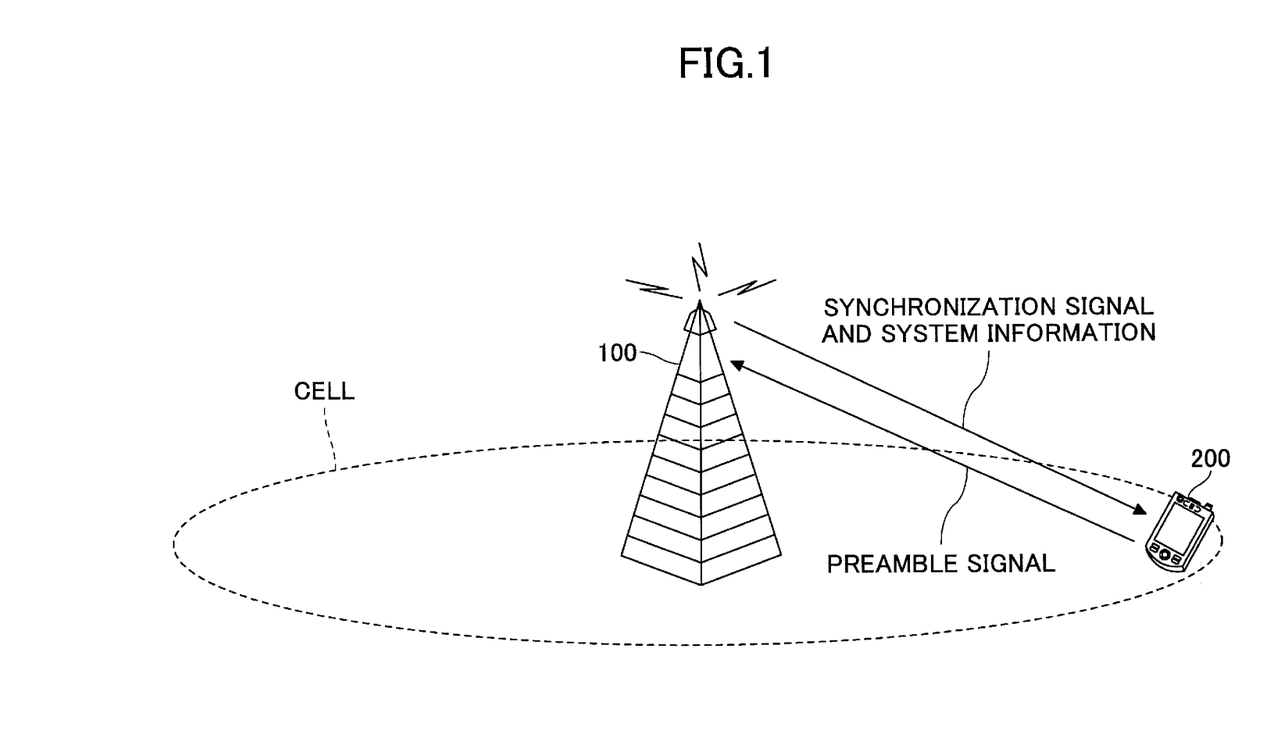
FIG. 1 is a diagram illustrating an example of a configuration of a radio communication system according to an embodiment of the present invention.

FIG. 1 is a diagram illustrating an example of a configuration of a radio communication system according to the embodiment of the present invention. The radio communication system according to the embodiment of the present invention includes a base station apparatus 100 and user equipment 200, as illustrated in FIG. 1. In FIG. 1, the single base station apparatus 100 and the single unit of user equipment 200 are illustrated; however, this is an example, and there may be a plurality of base station apparatuses 100 and a plurality of units of user equipment 200.

The base station apparatus 100 is a communication device that provides one or more cells, and that executes radio communication with the user equipment 200. As illustrated in FIG. 1, the base station apparatus 100 transmits a synchronization signal and system information to the user equipment 200. The synchronization signal is, for example, the NR-PSS and the NR-SSS. The system information is transmitted, for example, through the NR-PBCH. Each of the base station apparatus 100 and the user equipment 200 is capable of communicating signals by performing beam forming. The user equipment 200 is a communication device provided with a radio communication function, such as a smartphone, a cellular phone, a tablet, a wearable terminal, and an M2M (Machine-to-Machine) communication module; and the user equipment 200 wirelessly connects to the base station apparatus 100, and utilizes various types of communication services provided by the radio communication system. As illustrated in FIG. 1, at a step of the initial access, the user equipment 200 transmits a random access preamble signal to the base station apparatus 100. The random access is executed based on, in addition to the system information received from the base station apparatus 100 through the NR-PBCH, system information through the NR-PDSCH (Physical downlink shared channel).

Note that, in the embodiment, the duplex scheme may be a TDD (Time Division Duplex) scheme, a FDD (Frequency Division Duplex) scheme, or any other scheme (e.g., Flexible Duplex).

Further, in the following description, transmitting a signal using a transmit beam may imply transmitting a signal which is multiplied by a precoding vector (or which is precoded by the precoding vector). Similarly, receiving a signal using a reception beam may imply multiplying the received signal by a predetermined weight vector. Further, transmitting a signal using a transmit beam may be expressed as transmitting the signal with a specific antenna port. Similarly, receiving a signal using a reception beam may be expressed as receiving the signal with a specific antenna port. The antenna port refers to a logical antenna port or a physical antenna port defined by the 3GPP standard. Note that a method of forming a transmit beam and a reception beam is not limited to the above-described method. For example, a method may be used such that, in the base station apparatus 100 provided with a plurality of antennas and the user equipment 200 provided with a plurality of antennas, angles of the respective antennas are changed; a method may be used which combines a method using precoding vectors and a method of changing angles of antennas; a method may be used which combines a method of switching different antenna panels to utilize and a method of using multiple panels together; or any other method may be used. Furthermore, for example, in a high frequency band, a plurality of mutually different transmit beams may be used. Using a plurality of transmit beams is referred to as a multiple beam operation; and using a single transmit beam is referred to as a single beam operation.

Example 1

In the following, an example 1 is described.

Figure 2:
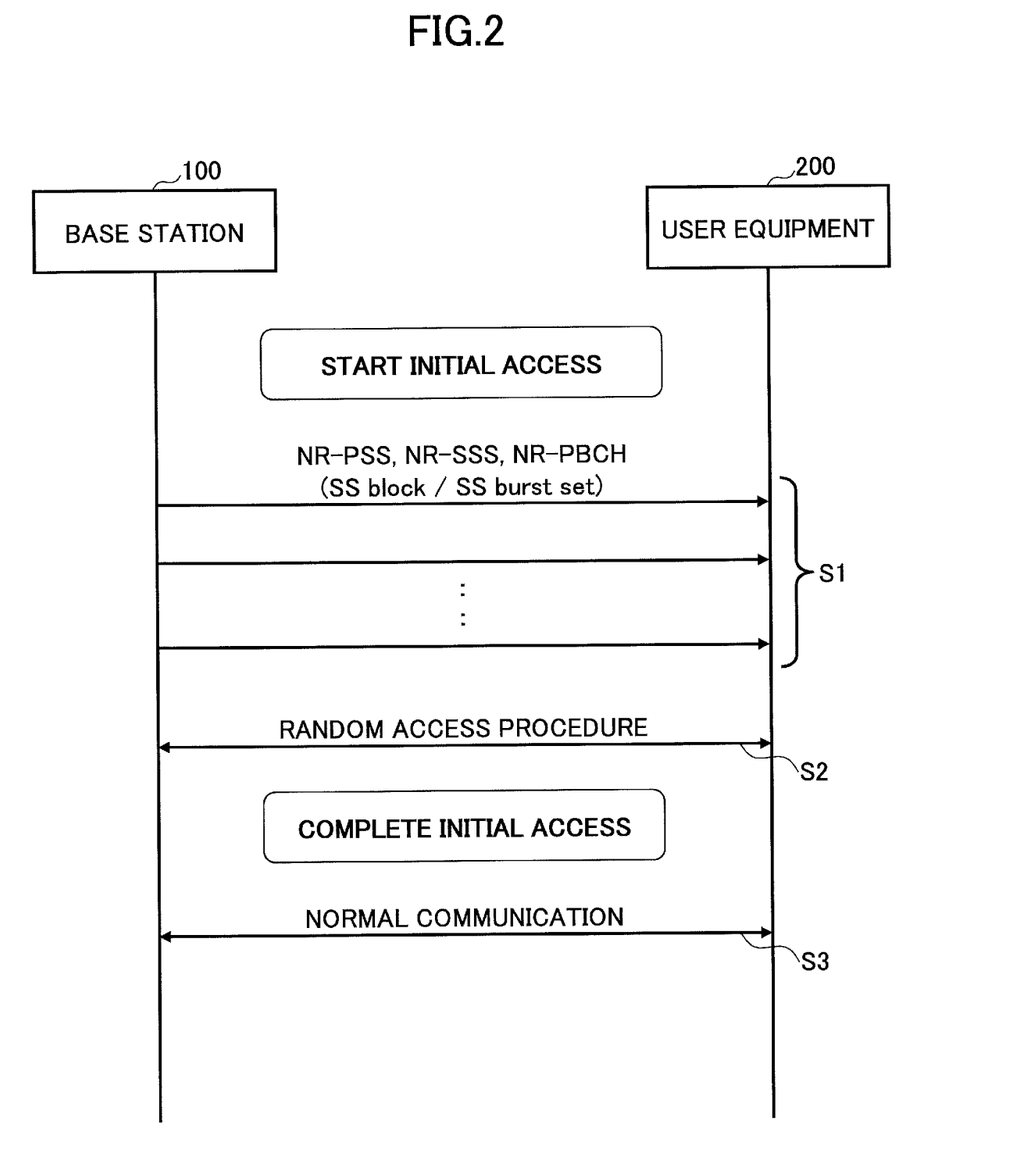
FIG. 2 is a diagram illustrating an example of an initial access sequence according to the embodiment of the present invention.

FIG. 2 is a diagram illustrating an example of an initial access sequence in the embodiment of the present invention. In response to the start of the initial access, the base station apparatus 100 transmits, at step S1, the NR-PSS, the NR-SSS, and the NR-PBCH, i.e., the SS block, to the user equipment 200. The NR-PBCH includes a part of the system information. The base station apparatus 100 repeatedly transmits, to the user equipment 200, the SS burst set formed of a plurality of SS blocks at a cycle of SS burst set periodicity. When the SS burst set includes a plurality of SS blocks, the plurality of SS blocks may be associated with different beams, respectively, in a multi-beam operation environment.

The user equipment 200 receives the NR-PSS transmitted from the base station apparatus 100, and the user equipment 200 uses it, at least, for initial time and frequency synchronization and for identifying a part of the cell ID (identify). Additionally, the user equipment 200 receives the NR-SSS transmitted from the base station apparatus 100, and the user equipment 200 uses it, at least, for identifying a part of the cell ID. Furthermore, the user equipment 200 receives the NR-PBCH transmitted from the base station apparatus 100 and obtains a part of the system information required for the initial access, such as a system frame number (SFN: System Frame Number) and information, etc., for obtaining any other system information. The other system information may be received through the NR-PDSCH, and the other system information includes a resource for executing a random access procedure, namely, information for identifying a preamble format, a RACH resource, and so forth. Furthermore, when the SS burst set includes a plurality of SS blocks, upon obtaining a specific SS block, the user equipment 200 transmits a preamble using a resource corresponding to a beam associated with the SS block to start the random access procedure (S2).

If, at step S2, the random access procedure between the base station apparatus and the user equipment 200 is successful, the initial access is completed, and the normal communication is started (S3).

Figure 3:
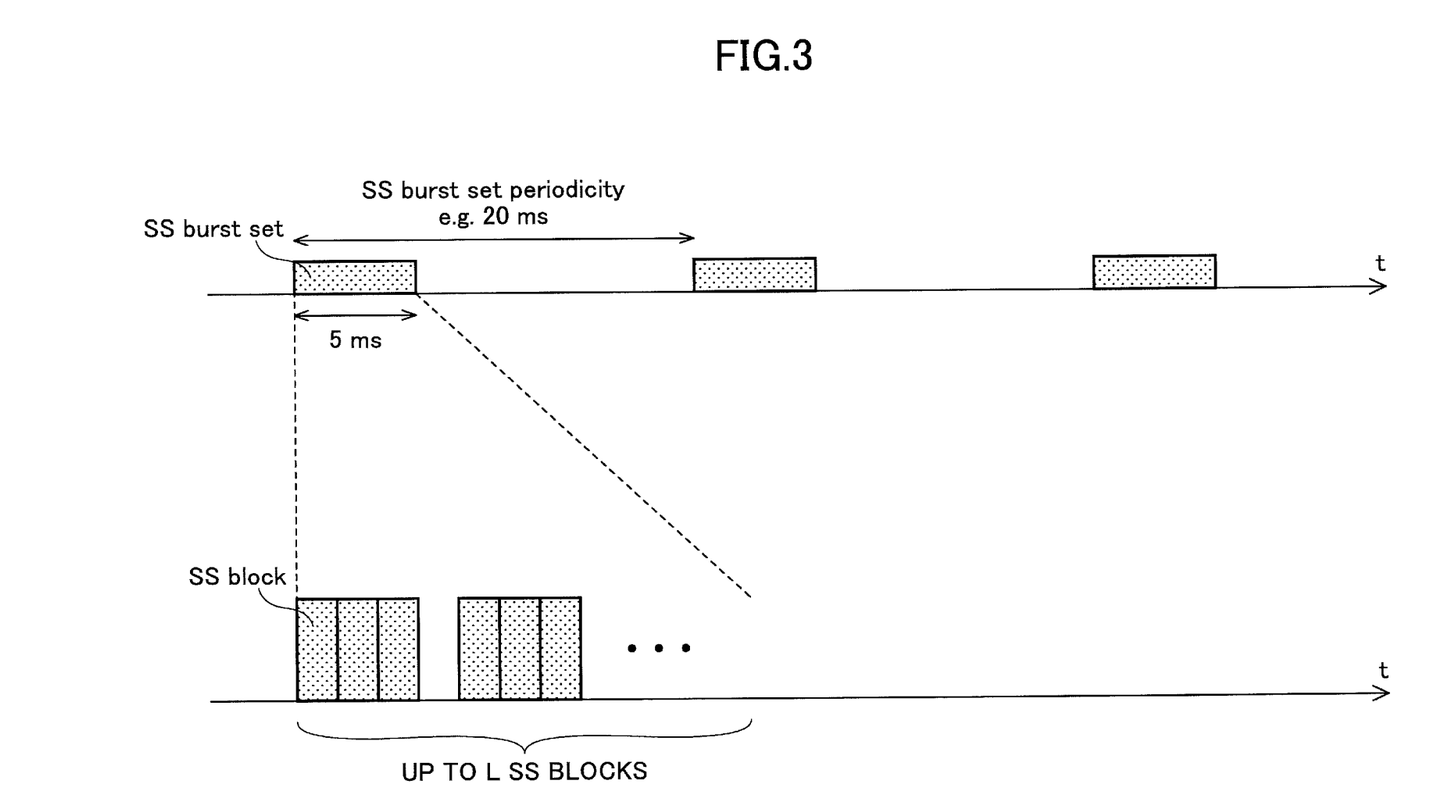
FIG. 3 is a diagram illustrating an example of an SS burst set according to the embodiment of the present invention.

FIG. 3 is a diagram illustrating an example of an SS burst set in the embodiment of the present invention. As illustrated in FIG. 3, the SS burst set is formed of 1 to L SS blocks. A candidate of a resource for transmitting an SS block is included within a time interval of 5 ms. A candidate of a resource at which no SS block is allocated is used for normal communication. L represents a maximum SS block number in the SS burst set, and L takes a different value depending on a frequency band. For example, L may be equal to 4 in a frequency band less than or equal to 3 GHz; L may be equal to 8 in a frequency band from 3 GHz to 6 GHz; and L may be equal to 64 in a frequency band from 6 GHz to 52.6 GHz.

Figure 4:
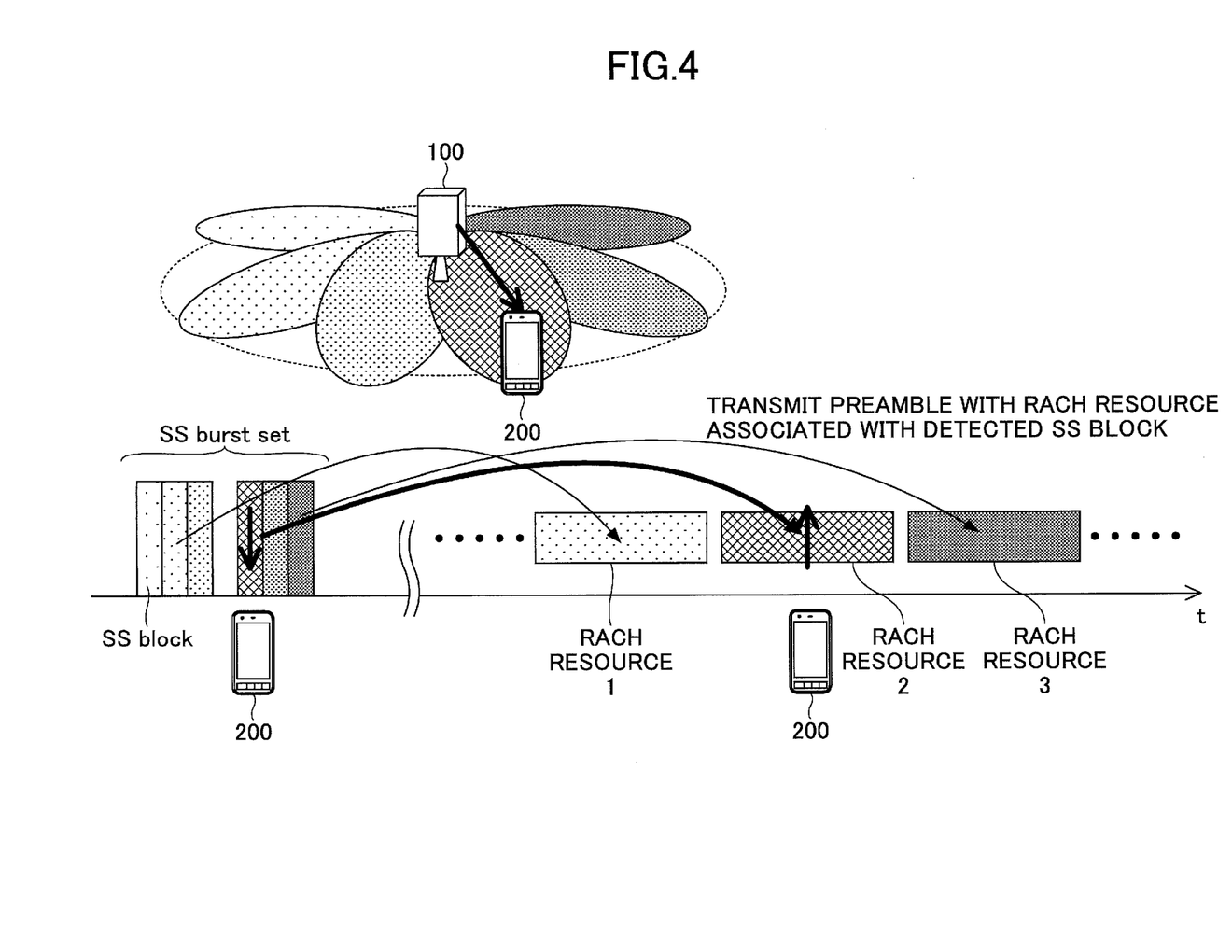
FIG. 4 is a diagram illustrating an example of RACH resources associated with SS blocks according to the embodiment of the present invention.

FIG. 4 is a diagram illustrating an example of RACH resources associated with SS blocks in the embodiment of the present invention. As illustrated in FIG. 4, in NR, a SS burst set that includes an SS block associated with a beam is transmitted from the base station apparatus 100. The user equipment 200 receives a detectable SS block, and transmits a preamble with a RACH resource associated with the received SS block to start an initial access procedure. The RACH resource may be associated with the beam.

In the example illustrated in FIG. 4, the user equipment 200 receives the fourth SS block included in the SS burst set, and the user equipment 200 transmits a preamble with the RACH resource 2 associated with the fourth SS block. Further, in the example illustrated in FIG. 4, the second SS block included in the SS burst set is associated with the RACH resource 1, and the sixth SS block included in the SS burst set is associated with the RACH resource 3.

Here, the user equipment 200 may receive a plurality of SS blocks associated with different beams, respectively. If the user equipment 200 can freely select an SS block to be used for an initial access procedure (e.g., a RACH procedure), the initial access procedure may be started using a RACH resource associated with an SS block that can be detected at an earliest timing. If reception quality of the SS block that can be detected at the earliest timing is compared with reception quality of an SS block that is associated with another beam, the reception quality of the SS block that can be detected at the earliest timing is not always favorable.

Furthermore, for example, during a retry of the initial access procedure, if it is not possible to refer to an SS block that is associated with a beam other than the beam used for the previous initial access procedure, the initial access procedure is started again after a waiting time according to a backoff similar to that of LTE elapsing from the timing of terminating the initial access procedure. Accordingly, if the user equipment 200 is unable to select the optimum SS block at the earliest timing, the latency related to the initial access may increase.

Thus, the user equipment 200 selects, from SS blocks that are transmitted from one or more base station apparatuses 100 through a plurality of beams, respectively, an SS block used for initial access depending on a received state of a synchronization signal of the SS block or a received state of a demodulation reference signal. The received state may be determined by a value based on the received power, such as RSRP (Reference Signal Received Power) or a path-loss value. Additionally or alternatively, the received state may be determined by a value based on reception quality, such as RSRQ (Reference Signal Received Quality) or SINR (Signal to Interference plus Noise Ratio).

If a SS block received with the most favorable reception state is selected as the SS block used for the initial access, and if the information included in the SS block indicates that visiting is unavailable, the user equipment 200 may exclude the SS block from candidates of the SS block used for the initial access. The case in which the information included in the SS block indicates that visiting is unavailable is, for example, a case in which the information included in the SS block indicates that the cell is restricted, or a case in which the information included in the SS block indicates that the cell is of a PLMN to which the user equipment 200 is not allowed to belong.

In the above-described embodiment 1, the user equipment 200 selects, from the SS blocks transmitted from the one or more base station apparatuses 100 through the plurality of beams, respectively, an SS block that is received with the optimum reception state as the SS block used for the initial access, and thereby the SS block used for the initial access can be appropriately selected.

Namely, in a radio communication system, an appropriate system information item can be selected by user equipment from a plurality of system information items that is required for initial access and that is associated with beams.

Example 2

An example 2 is described below. In the example 2, a point that is different from the example 1 is described. Accordingly, points that are not particularly described may be the same as those of the example 1.

Figure 5:
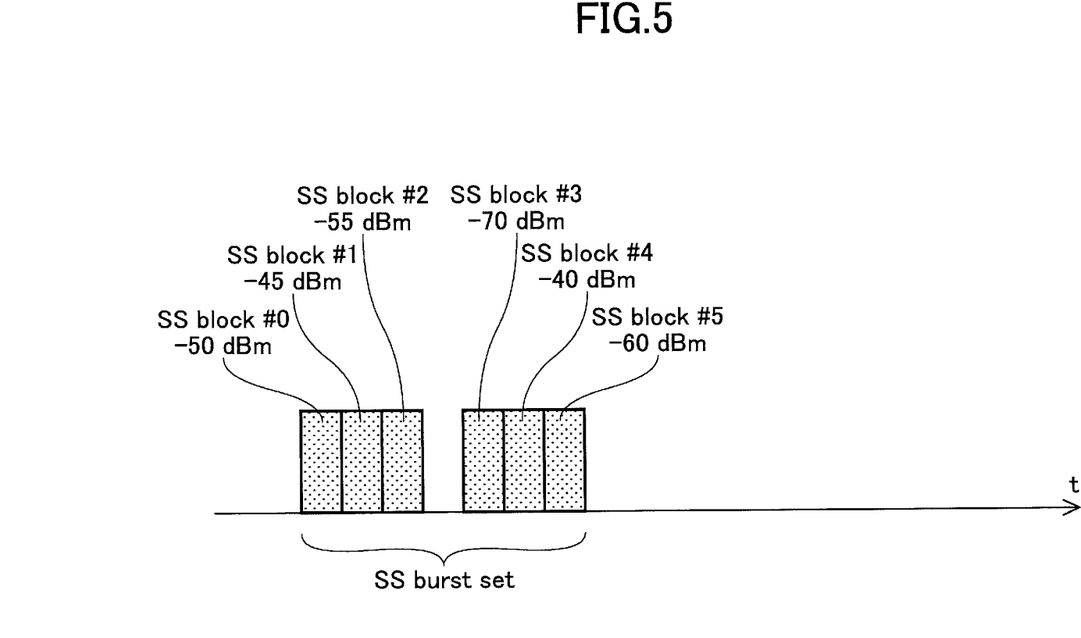
FIG. 5 is a diagram illustrating an example of a received state of the SS blocks according to the embodiment of the present invention.

FIG. 5 is a diagram illustrating an example of a reception state of SS blocks in the embodiment of the present invention. In NR, it can be assumed to be specified that the user equipment 200 is not allowed to select a SS block transmitted from a beam of a base station apparatus 100 other than the previous base station during retry of the initial access procedure.

Here, if there is a plurality of SS blocks with approximately the same reception quality, such as the RSRQ or SINR, or with approximately the same received power, such as the RSRP or the path-loss value, the SS block with the most favorable received power or received quality may not always be the appropriate SS block for the user equipment 200 to execute the initial access.

For example, even if the user equipment 200 can receive a SS block with the best received power or reception quality through a downlink channel, the received power or the reception quality at the base station apparatus 100 on an uplink channel is not the best, and the preamble may not be received at the base station apparatus 100 due to blocking, etc. In such a case, even if the user equipment 200 transmits, more than once, a preamble with the RACH resource associated with a specific SS block, the preamble may not reach the base station apparatus 100.

Thus, if there are one or more SS blocks with, for example, a measured value within X dB from the best received power or reception quality of the received SS block, the user equipment 200 may select the SS block to be used for the initial access from the one or more SS blocks. Consequently, the SS block to be used for the initial access may be selected from, in addition to the SS block with the best received power value or reception quality value, SS blocks with measured values within X dB from the best value, as the candidates.

Additionally, for example, when the user equipment 200 executes an initial access procedure with switching of the SS block from the SS block with the best received power value or reception quality value to an SS block with a measured value within X dB from that, during retry of the initial access procedure, the SS block may be switched to an SS block other than the SS block used for executing the previous initial access procedure, and a preamble may be transmitted with a RACH resource associated with the switched SS block.

Additionally, for example, if it can be confirmed that there exists another SS block with a measured value that is within X dB from that of the SS block with the best received power value or reception quality value, the user equipment 200 may switch the SS block to be an SS block other than the SS block used for the previous transmission, and may transmit a preamble with a RACH resource associated with the SS block.

FIG. 5 is an example of a received state of the SS blocks, and each dBm value represents received power of a corresponding SS block. As shown in FIG. 5, the SS block #4 has the best received power—40 dBm. For example, if X=5 for the above-described X dB, the user equipment 200 may select the SS block #1 with the received power—45 dBm. Furthermore, for example, if X=15 for the above-described X dB, the user equipment 200 may select the SS block #1 with the received power—45 dBm; the SS block #0 with the received power—50 dBm; and the SS block #2 with the received power—55 dBm.

Additionally, for example, if the user equipment 200 switches the SS block to an SS block with a measured value within X dB from that of the SS block with the best received power value or reception quality value, the user equipment 200 may decrease the maximum number of retransmissions of the preamble transmitted during an initial access procedure. The initial access procedure may be for a retry.

Additionally, for example, if it can be confirmed that there exists another SS block with a measured value that is within X dB from that of the SS block with the best received power value or reception quality value, the user equipment 200 may decrease the maximum number of retransmissions of the preamble transmitted during an initial access procedure. The initial access procedure may be for a retry.

Additionally, for example, if the user equipment 200 switches the SS block to an SS block with a measured value that is within X dB from that of the SS block with the best received power value or received quality value, the user equipment 200 may start the subsequent initial access procedure without signaling to a higher layer, even if a number of times of transmission of the preamble transmitted during an initial access procedure exceeds the maximum number of retransmissions. The initial access procedure may be for a retry.

Additionally, for example, if it can be confirmed that there exists another SS block with a measured value that is within X dB from that of the SS block with the best received power value or reception quality value, the user equipment 200 may start the subsequent initial access procedure without signaling to a higher layer, even if a number of times of transmission of the preamble transmitted during an initial access procedure exceeds the maximum number of retransmissions. The initial access procedure may be for a retry.

If the user equipment 200 selects an SS block other than the SS block used for the previous initial access procedure during a retry of the initial access procedure, and there exist one or more SS blocks with a measured value that is, for example, within Y dB from a received power value or reception quality value according to a current measurement of the SS block used for executing the previous initial access procedure, the user equipment 200 may select an SS block used for the initial access from the one or more SS blocks. Namely, a standard for selecting the SS block may be changed between execution of the initial access procedure and a retry of the execution of the initial access procedure, so that an SS block with the received power or reception quality within X dB is selected for the execution of the initial access procedure, and an SS block with the received power or reception quality within Y dB is selected for the retry of the execution of the initial access procedure.

FIG. 5 is an example of the received state of the SS blocks, and each dBm value represents received power of a corresponding SS block. Suppose that the SS block #4 is used for the previous initial access procedure. For example, if Y=10 for the above-described Y dB, the user equipment 200 can select the SS block #1 with the received power—45 dBm and the SS block #0 with the received power—50 dBm.

Furthermore, for example, if Y=20 for the above-described Y dB, the user equipment 200 can select the SS block #1 with the received power—45 dB; the SS block #0 with the received power—50 dBm; the SS block #2 with the received power—55 dBm; and the SS block #5 with the received power—60 dBm.

The values of the above-described X and Y may be the same values; may be predetermined based on the maximum number of retransmissions, a retransmission number of times, a power ramping value, etc.; or may be signaled from the base station apparatus 100 to the user equipment 200 by the RRC (Radio Resource Control) signaling, MAC (Medium Access Control) layer signaling, etc.

Note that, if it is defined that the user equipment 200 may select a different SS block for a retry of the initial access procedure, the above-described procedure can be applied by setting the above-described X to infinity.

In the above-described example 2, the user equipment 200 is allowed to select, in addition to the SS block received with the optimum received state, an SS block with a measured value within a predetermined range with respect to the received state as an SS block to be used for initial access, from SS blocks transmitted from one or more base station apparatuses 100 through a plurality of beams, respectively, and thereby the user equipment 200 can appropriately select the SS block to be used for the initial access.

Namely, in a radio communication system, user equipment can select an optimum system information item, from a plurality of system information items associated with beams, which is required for initial access.

(Device Configuration)

Next, examples of functional configurations of the base station apparatus 100 and the user equipment 200 are described, which execute the process and the operation described above. Each of the base station apparatus 100 and the user equipment 200 include, at least, a function for executing the examples 1 and 2. However, each of the base station apparatus 100 and the user equipment 200 may include only a part of the functions of the examples 1 and 2.

<The Base Station Apparatus 100>

Figure 6:
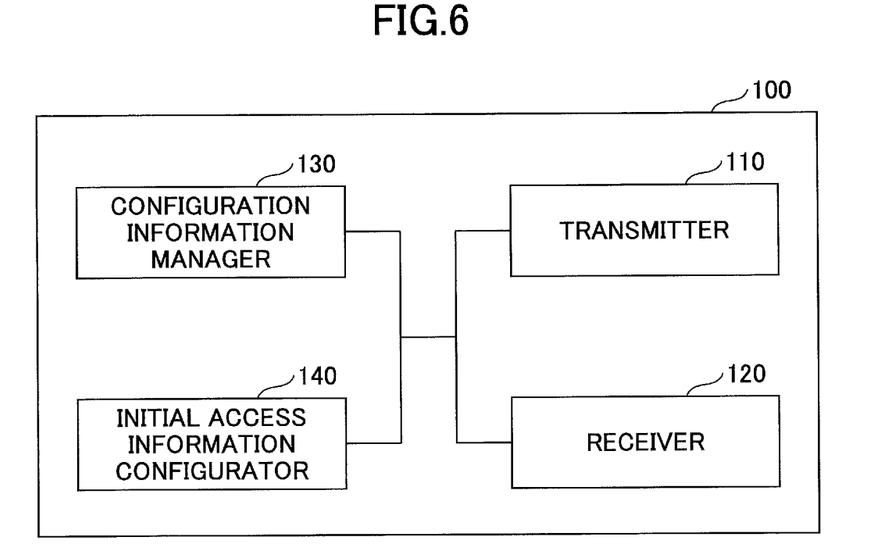
FIG. 6 is a diagram illustrating an example of a functional configuration of a base station apparatus 100.

FIG. 6 is a diagram illustrating an example of a functional configuration of the base station apparatus 100. As illustrated in FIG. 6, the base station apparatus 100 includes a transmitter 110; a receiver 120; a configuration information manager 130; and an initial access information configurator 140. Note that the functional configuration illustrated in FIG. 6 is merely an example. The functional division and the names of the functional units may be any division and names, provided that the operations of the embodiments of the present invention can be executed.

The transmitter 110 includes a function for generating a signal to be transmitted to the user equipment 200, and for wirelessly transmitting the signal. The receiver 120 includes a function for receiving various types of signals transmitted from the user equipment 200, and for retrieving, for example, higher layer information from the received signal. Further, the transmitter 110 includes a function for transmitting the NR-PSS, the NR-SSS, the NR-PBCH, a DL/UL control signal, etc., to the user equipment 200. Furthermore, the transmitter 110 transmits information related to transmission power control and information related to scheduling to the user equipment 200, and the receiver 120 receives a message, etc., related to a preamble and initial access from the user equipment 200.

The configuration information manager 130 stores configuration information that is preconfigured and various types of configuration information to be transmitted to the user equipment 200. Content of the configuration information is, for example, system information, etc., used for initial access.

The initial access information configurator 140 executes control related to transmission of system information including information used for a synchronization signal and initial access to the user equipment 200 in the base station apparatus 100, and executes control related to initial access from the user equipment 200, which are described in the examples 1, 2, and 3.

<User Equipment 200>

Figure 7:
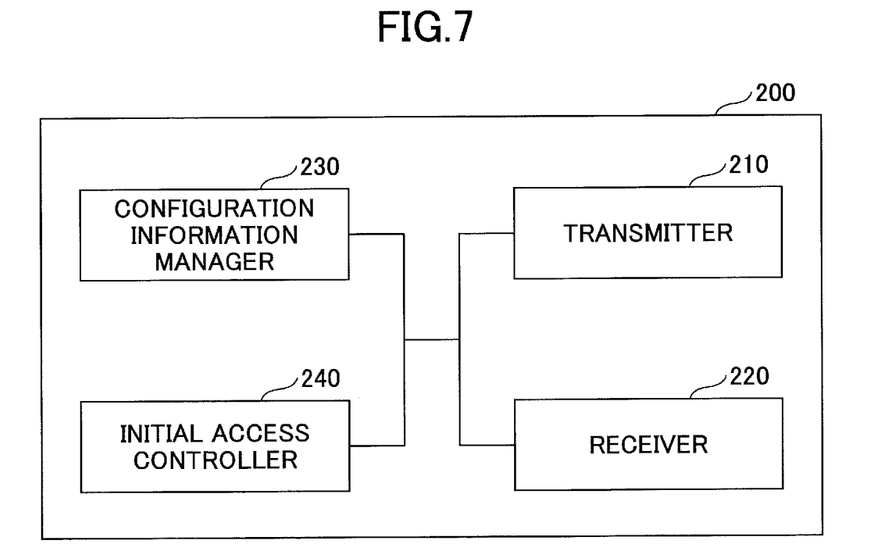
FIG. 7 is a diagram illustrating an example of a functional configuration of user equipment 200.

FIG. 7 is a diagram illustrating an example of a functional configuration of the user equipment 200. As illustrated in FIG. 7, the user equipment 200 includes a transmitter 210; a receiver 220; a configuration information manager 230; and an initial access controller 240. The functional configuration illustrated in FIG. 7 is merely an example. A functional division and names of functional units may be any functional division and names, as long as the operation according to the embodiments of the present invention can be executed.

The transmitter 210 creates a transmit signal from transmit data, and wirelessly transmits the transmit signal. The receiver 220 wirelessly receives various types of signals, and retrieves a higher layer signal from a received physical layer signal. Furthermore, the receiver 220 includes a function for receiving the NR-PSS, the NR-SSS, the NR-PBCH, a DL/UL control signal, etc., which are transmitted from the base station apparatus 100. Further, the transmitter 210 transmits a message, etc., related to a preamble and initial access to the base station apparatus 100, and the receiver 120 receives a synchronization signal and system information from the base station apparatus 100.

The configuration information manager 230 stores various types of configuration information received from the base station apparatus 100 with the receiver 220. Additionally, the configuration information manager 230 stores preconfigured configuration information. Content of the configuration information is, for example, the information to be used for the initial access, etc.

The initial access controller 240 executes control related to initial access in the user equipment 200, which is described in the examples 1, 2, and 3. Note that a functional unit related to preamble signal transmission, etc., in the initial access controller 240 may be included in the transmitter 210, and a functional unit related to reception, etc., of the system information in the initial access controller 240 may be included in the receiver 220.

<Hardware Configuration>

Note that the functional configuration diagrams (FIG. 6 and FIG. 7) used for the description of the above-described embodiments of the present invention indicate blocks in units of functions. These functional blocks (components) can be implemented by any combination of hardware and/or software. Furthermore, a method for implementing each functional block is not particularly limited. Namely, each functional block may be implemented by a single device that is physically and/or logically connected; or may be implemented by a plurality of devices by directly and/or indirectly connecting (e.g., by a wire line and/or a radio link) two or more devices that are physically and/or logically separated.

Figure 8:
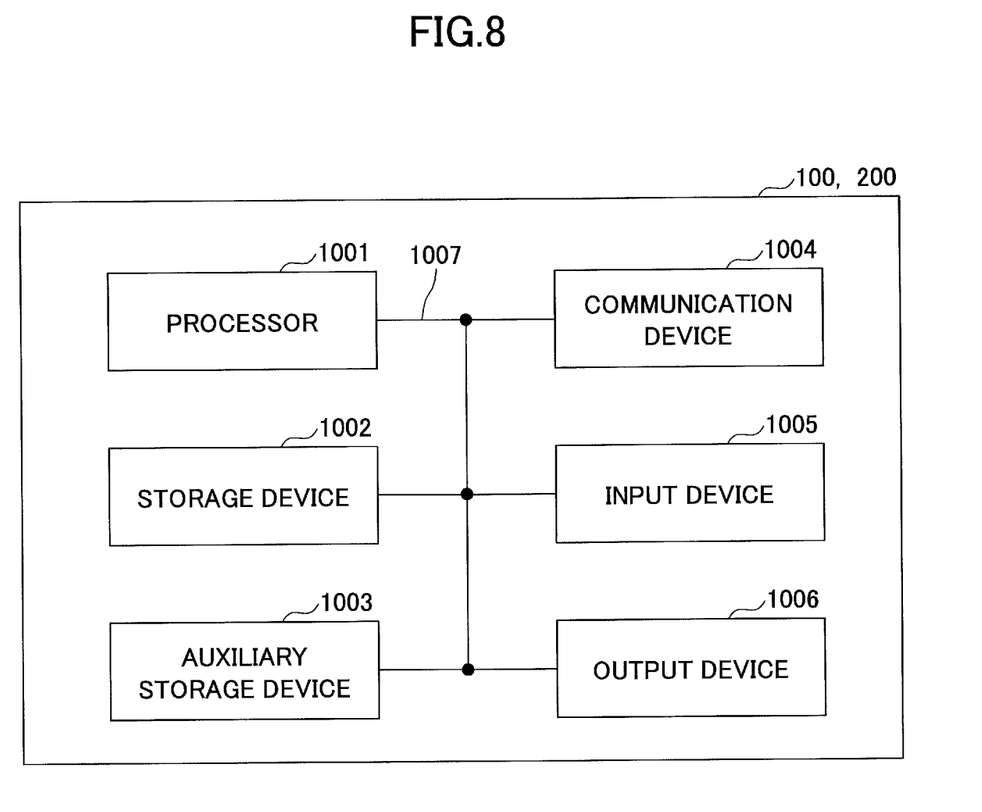
FIG. 8 is a diagram illustrating an example of a hardware configuration of the base station apparatus 100 and the user equipment 200.

For example, each of the base station apparatus 100 and the user equipment 200 according to the embodiment of the present invention may function as a computer for executing the process according to the embodiment of the present invention. FIG. 8 is a diagram illustrating an example of a hardware configuration of a radio communication device that is the base station apparatus 100 or the user equipment 200 according to the embodiments of the present invention. Each of the above-described base station apparatus 100 and the user equipment 200 may be physically configured as a computer device including a processor 1001; a storage device 1002; an auxiliary storage device 1003; a communication device 1004; an input device 1005; an output device 1006; a bus 1007, and so forth.

Note that, in the following description, the term "apparatus" can be interchangeable with a circuit, a device, a unit, etc. The hardware configuration of each of the base station apparatus 100 and the user equipment 200 may be configured to include one or a plurality of devices, which are indicated by 1001 through 1006, illustrated in the drawing; or may be configured not to include a part of the devices.

After loading predetermined software (program) on hardware, such as the processor 1001 and the storage device 1002, each function of the base station apparatus 100 and the user equipment 200 can be implemented by the processor 1001 by operating to control the communication by the communication device 1004 and/or reading out data and/or writing data in the storage device 1002 and the auxiliary storage device 1003.

The processor 1001, for example, operates the operating system to control the entire computer. The processor 1001 may be formed of a central processing unit (CPU: Central Processing Unit) including an interface with a peripheral device; a control device; a processor; a register; and so forth.

Furthermore, the processor 1001 reads out a program (program code), a software module, and/or data from the auxiliary storage device 1003 and/or the communication device 1004 onto the storage device 1002, and executes various processes in accordance with these. As the program, a program may be used that causes a computer to execute at least a part of the operation described in the above-described embodiment. For example, the transmitter 110, the receiver 120, the configuration information manager 130, and the initial access information configurator 140 of the above-described base station apparatus 100 shown in FIG. 7, may be implemented by a control program that is stored in the storage device 1002 and operated by the processor 1001. Additionally, for example, the transmitter 210, the receiver 220, the configuration information manager 230, and the initial access controller 240 of the user equipment 200 shown in FIG. 8 may be implemented by a control program that is stored in the storage device 1002 and operated by the processor 1001. It is described that each of the above-described processes is executed by the single processor 1001; however, it can be simultaneously or sequentially executed by two or more processors 1001. The processor 1001 may be implemented by one or more chips. Here, the program may be transmitted from a network through an electric telecommunication line.

The storage device 1002 may be a computer readable recording medium, and may be formed of, for example, at least one of a ROM (Read Only Memory), an EPROM (Erasable Programmable ROM), an EEPROM (Electrically Erasable Programmable ROM), a RAM (Random Access Memory), and so forth. The storage device 1002 may be referred to as a register, a cache, a main memory (main memory device), and so forth. The storage device 1002 can store a program (program code), a software module, and so forth that can be executed to implement the processing according to the embodiment of the present invention.

The auxiliary storage device 1003 is a computer readable recording medium, and may be formed of, for example, at least one of an optical disk, such as a CD-ROM (Compact Disc ROM); a hard disk drive; a flexible disk; a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, and so forth. The auxiliary storage device 1003 may be referred to as an auxiliary storage. The above-described storage medium may be, for example, a database including the storage device 1002 and/or the auxiliary storage device 1003, a server, or another appropriate medium.

The communication device 1004 is hardware (transceiver device) for executing communication between computers through a wired network and/or a wireless network; and, for example, the communication device 1004 may also be referred to as a network device, a network controller, a network card, a communication module, and so forth. For example, each of the above-described transmitter 110 and the receiver 120 may be implemented by the communication device 1004. Additionally, the transmitter 210 and the receiver 220 of the user equipment 200 may be implemented by the communication device 1004.

The input device 1005 is an input device (e.g., a keyboard, a mouse, a microphone, a switch, a button, a sensor, etc.) for receiving an input from the outside. The output device 1006 is an output device (e.g., a display, a speaker, a LED lamp, etc.) for providing output to the outside. Here, the input device 1005 and the output device 1006 may be integrated (e.g., a touch panel).

Further, each of the devices, such as the processor 1001 and/or the storage device 1002, is connected by a bus 1007 for communicating information. The bus 1007 may be formed of a single bus, or may be formed of buses that differ depending on a pair of devices.

Further, each of the base station apparatus 100 and the user equipment 200 may be formed to include hardware, such as a microprocessor, a digital signal processor (DSP: Digital Signal Processor), an ASIC (Application Specific Integrated Circuit), a PLD (Programmable Logic Device), and a FPGA (Field Programmable Gate Array); and a part or all of the respective functional blocks may be implemented by the hardware. For example, the processor 1001 may be implemented by at least one of these hardware components.

Conclusion of the Embodiments

As described above, according to the embodiments of the present invention, there is provided user equipment for communicating with a base station apparatus, the user equipment including a receiver that receives, from the base station apparatus, one or more blocks associated with one or more beams transmitted from the base station apparatus, the one or more blocks including information used for initial access; a controller that selects a block used for determining a resource for transmitting a preamble from the one or more blocks, based on received power or reception quality of the one or more beams; and a transmitter that transmits the preamble to the base station apparatus using the resource.

With the above-described configuration, the user equipment can select an appropriate system information item, from a plurality of information items associated with the one or more beams, that is required for the initial access.

The controller may select, from the one or more blocks, a block associated with a beam with optimum received power or reception quality of the one or more beams, as the block used for determining the resource for transmitting the preamble. With this configuration, the user equipment can use an SS block with the optimum received power or reception quality for the initial access.

The controller may exclude a block including information indicating that visiting is unavailable to the user equipment, from the block to be selected. With this configuration, the user equipment can select the appropriate system information item, from the plurality of system information items, that is required for the initial access.

The controller may select a block used for determining the resource for transmitting the preamble, from a block associated with a beam with optimum received power or reception quality of the one or more beams; and a block associated with a beam with received power or reception quality within a predetermined range from the optimum received power or reception quality. With this configuration, the user equipment can flexibly select the system information item, from the plurality of system information items required for the initial access.

During a retry of an initial access procedure, the controller may select a block used for determining the resource for transmitting the preamble, from a block used for execution of the initial access procedure; and a block associated with a beam with received power or reception quality within a predetermined range from received power or reception quality of a beam corresponding to the block used for the execution of the initial access procedure. With this configuration, during the retry of the initial access procedure, the user equipment can select another SS block, in addition to the SS block used for the previous initial access procedure.

In response to detecting, by the receiver, a block associated with a beam with optimum received power or reception quality of the one or more beams and a block associated with a beam with received power or reception quality within a predetermined range from the optimum received power or reception quality, the controller may decrease a maximum number of retransmissions of the preamble in an initial access procedure; start a retry of the initial access procedure without signaling to a higher layer when a number of times of transmission of the preamble exceeds the maximum number of retransmissions in the initial access procedure; and use a block other than a block used for execution of the initial access procedure during the retry of the initial access procedure. With this configuration, the user equipment can set the maximum number of retransmissions of the preamble at the start of the initial access procedure depending on an SS block state, and, by omitting the signaling to the higher layer when the maximum number of retransmissions is exceeded, the retransmission of the initial access procedure can be quickly started, and another SS block can be used during the retry of the initial access procedure.

Additional Embodiments

The embodiments of the present invention are described above; however the disclosed invention is not limited to the embodiments, and a person ordinarily skilled in the art will appreciate various variations, modifications, alternatives, replacements, and so forth. Specific examples of numerical values are used in the description in order to facilitate understanding of the invention; however, these numerical values are merely an example, and any other appropriate values may be used, except as indicated otherwise. The separations of the items in the above description are not essential to the present invention; and depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the procedures described in the embodiments may be changed, as long as there is no contradiction. For the convenience of description of the process, the base station apparatus 100 and the user equipment 200 are described by using the functional block diagrams; however, such devices may be implemented in hardware, software, or combinations thereof. Each of the software to be executed by the processor included in the base station apparatus 100 in accordance with the embodiment of the present invention and the software to be executed by the processor included in the user equipment 200 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Notification of information is not limited to the aspect/embodiment described in the present specification, and may be performed by other methods. For example, notification of information may be performed via physical layer signaling (for example, DCI (Downlink Control Information) or UCI (Uplink Control Information)); upper-layer signaling (for example, RRC (Radio Resource Control) signaling, MAC (Medium Access Control) signaling, broadcast information (MIB (Master Information Block), or SIB (System Information Block)); other signals, or by a combination thereof. Furthermore, RRC signaling may be referred to as an RRC message; and the RRC signaling may be, for example, an RRC connection setup (RRC Connection Setup) message, an RRC connection reconfiguration (RRC Connection Reconfiguration) message, and so forth.

Each aspect/embodiment described in this specification may be applied to LTE (long term evolution), LTE-A (LTE-advanced), SUPER 3G, IMT-Advanced, 4G, 5G, FRA (future radio, W-CDMA (registered trademark), GSM (registered trademark), CDMA2000, UMB (ultra mobile broadband), IEEE 802.11 (Wi-Fi), IEEE 802.16 (WiMAX), IEEE 802.20, UWB (ultra-wideband), Bluetooth (registered trademark), any other systems using an appropriate system and/or next generation systems extended based on these systems.

Processing procedures, sequences, flowcharts, and so forth of each embodiment/modified example described in the specification may be exchanged as long as there is no contradiction. For example, for the methods described in the specification, the elements of the various steps are presented in an exemplary order and are not limited to a specific order presented.

The specific operation that is described in this specification to be performed by the base station apparatus 100 may be performed by an upper node of the base station apparatus 100 in some cases. In a network formed of one or more network nodes that includes the base station apparatus 100, it is clear that various operations to be performed for communication with the user equipment 200 can be performed by the base station apparatus 100 and/or another network node other than the base station apparatus 100 (for example, the MME or the S-GW can be considered; however, it is not limited to these). In the above, the case is exemplified where there is one network node other than the base station apparatus 100; however, a combination of a plurality of other network nodes (e.g., the MME and the S-GW) may be used.

Each aspect/embodiment described in the specification may be used alone; may be combined to be used; or may be switched in accordance with execution.

The user equipment 200 may be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a hand set, a user agent, a mobile client, a client, or some other suitable terms, by a person ordinarily skilled in the art.

The base station apparatus 100 may be referred to as a NB (NodeB), an eNB (enhanced NodeB), a base station (Base Station) or or some other suitable terms, by a person ordinarily skilled in the art.

The terms "determining" and "deciding" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least."

As long as "include," "including," and the variations thereof are used in the specification and the claims, these terms are intended to be inclusive, similar to the term "comprising." Furthermore, it is intended that the term "or" used in this specification or the claims is not "exclusive OR."

In the whole of the present disclosure, for example, if articles are added by translation, such as "a," "an," and "the" in English, these articles may include a plurality of things, unless as clearly indicated otherwise by the context.

Note that, in the embodiments of the present invention, the SS block is an example of a block. The initial access controller 240 is an example of a controller.

The present invention is described in detail above; however, it is apparent to a person ordinarily skilled in the art that the present invention is not limited to the embodiments described in the present specification. The present invention can be implemented as modifications and alterations without departing from the sprit and scope of the present invention that are defined by the descriptions of the claims. Accordingly, an object of the description of this specification is for exemplification and illustration; and the description of this specification does not have any restrictive meaning to the present invention.

LIST OF REFERENCE SYMBOLS 100 base station apparatus
200 user equipment
110 transmitter
120 receiver
130 configuration information manager
140 initial access information configurator
200 user equipment
210 transmitter
220 receiver
230 configuration information manager
240 initial access controller
1001 processor
1002 storage device
1003 auxiliary storage device
1004 communication device
1005 input device
1006 output device

The invention claimed is:

1. A terminal comprising:
a receiver that receives, from a base station apparatus, one or more synchronization signal blocks associated with one or more beams transmitted from the base station apparatus, the one or more synchronization signal blocks including information on initial access;
a controller that selects a synchronization signal block used for determining a resource for transmitting a preamble from the one or more synchronization signal blocks, based on at least one of received power or reception quality of the one or more synchronization signal blocks; and
a transmitter that transmits the preamble to the base station apparatus using the resource,
wherein if information included in the selected synchronization signal block indicates that the cell is restricted, the controller excludes the synchronization signal block from candidates of the synchronization signal block used for the initial access.

2. The terminal according to claim 1, wherein the controller selects, from the one or more synchronization signal blocks, a synchronization signal block with at least one of the optimum received power or the optimum received quality, as the synchronization signal block used for determining the resource for transmitting the preamble.

3. The terminal according to claim 1, wherein the controller selects, from the synchronization signal block with at least one of the optimum received power or the optimum received quality and a synchronization signal block with received power or received quality that is within a predetermined range from the optimum received power or the optimum received quality of the synchronization signal block, the synchronization signal block used for determining the resource for transmitting the preamble.

4. A communication method executed by a terminal, the method comprising:
receiving, from a base station apparatus, one or more synchronization signal blocks associated with one or more beams transmitted from the base station apparatus, the one or more synchronization signal blocks including information on initial access;
selecting a synchronization signal block used for determining a resource for transmitting a preamble from the one or more synchronization blocks, based on at least one of received power and received quality of the one or more synchronization signal blocks; and
transmitting the preamble to the base station apparatus using the resource,
wherein if information included in the selected synchronization signal block indicates that the cell is restricted, excluding the synchronization signal block from candidates of the synchronization signal block used for the initial access.

5. A radio communication system comprising:
a terminal; and
a base station apparatus,
wherein the base station apparatus includes a transmitter that transmits one or more synchronization signal blocks associated with one or more transmitted beams, the one or more synchronization signal blocks including information on initial access;
wherein the terminal includes
a receiver that receives, from the base station apparatus, the one or more synchronization signal blocks associated with the one or more beams transmitted from the base station apparatus, the one or more synchronization signal blocks including the information on initial access;
a controller that selects a synchronization signal block used for determining a resource for transmitting a preamble from the one or more synchronization blocks, based on at least one of received power and received quality of the one or more synchronization signal blocks; and
a transmitter that transmits the preamble to the base station apparatus using the resource, and
wherein if information included in the selected synchronization signal block indicates that the cell is restricted, the controller excludes the synchronization signal block from candidates of the synchronization signal block used for the initial access.

* * * * *